(12) United States Patent
Lee

(10) Patent No.: US 7,063,385 B2
(45) Date of Patent: Jun. 20, 2006

(54) MOUNTING STRUCTURE FOR DOUBLE-FOLDING SEATS FOR VEHICLES

(75) Inventor: Byoung Jae Lee, Seoul (KR)

(73) Assignee: Kia Motors Corporation, Seoul (KR)

( * ) Notice: Subject to any disclaimer, the term of this patent is extended or adjusted under 35 U.S.C. 154(b) by 0 days.

(21) Appl. No.: 11/028,286

(22) Filed: Dec. 30, 2004

(65) Prior Publication Data
US 2005/0253438 A1 Nov. 17, 2005

(30) Foreign Application Priority Data
Apr. 29, 2004 (KR) ............... 10-2004-0029785

(51) Int. Cl.
*B60N 2/30* (2006.01)
(52) U.S. Cl. .......... 297/335; 297/326; 296/65.05
(58) Field of Classification Search ............ 297/378.1, 297/378.12, 335, 337, 326; 296/65.09, 65.05, 296/65.16
See application file for complete search history.

(56) References Cited

U.S. PATENT DOCUMENTS 4,376,552 A * 3/1983 Pilhall .................. 297/391
5,913,570 A * 6/1999 Yoshida et al. ......... 297/378.14
6,375,255 B1 * 4/2002 Maruta et al. ................ 297/15
6,695,405 B1 * 2/2004 Senseby et al. .......... 297/378.1

FOREIGN PATENT DOCUMENTS

| DE | 201 05 080 U1 | 8/2002 |
| DE | 35 46 147 A1 | 7/2003 |
| DE | 203 17 023 U1 | 3/2004 |
| DE | 699 10 647 T2 | 6/2004 |
| EP | 1 164 050 A1 | 12/2001 |

* cited by examiner

Primary Examiner—Peter R. Brown
(74) Attorney, Agent, or Firm—Morgan Lewis & Bockius LLP

(57) ABSTRACT

A mounting structure for a double-folding seat for vehicles in which a seat cushion and a seat back can be double-folded, comprises a cushion hinge bracket, a cushion hinge wire, and a vehicle body hinge bracket. The cushion hinge bracket is connected to a lower portion of the seat cushion. The cushion hinge wire is rotatably connected to the cushion hinge bracket. The vehicle body hinge bracket is provided to an upper surface of a seat mounting part and to which the cushion hinge wire is rotatably connected, so that the seat cushion is foldable with respect to the vehicle body hinge bracket.

8 Claims, 3 Drawing Sheets

MOUNTING STRUCTURE FOR DOUBLE-FOLDING SEATS FOR VEHICLES

CROSS REFERENCE TO RELATED APPLICATION

This application claims priority of Korean Application No. 10-2004-0029785, filed on Apr. 29, 2004, the disclosure of which is incorporated herein by reference.

FIELD OF THE INVENTION

The present invention relates to a mounting structure for double-folding seats for vehicles, and more particularly, to a mounting structure in which a position of the hinge point is located to improve appearance and decrease the rotating radius of the double-folding seat.

BACKGROUND OF THE INVENTION

Double-folding seats are adapted in a vehicle in order to increase passenger convenience and to optimize cargo space. In particular, a second array double-folding seat or a third array double-folding seat in a recreational vehicle or a sport-utility vehicle is generally configured to be rotatable toward a first array seat by approximately 90 degrees, thereby increasing space for loading cargo.

However, in many conventional double-folding seats, when the seat cushion is rotated toward the front direction, the rotating radius thereof is relatively great. This can cause the seat cushion to collide with the first array seat. In order to prevent such a collision between the double-folding seat and the first array seat, a conventional solution is to slide the first array seat in the front direction before folding the double-folding seat. Accordingly, for such manipulation, a room for a passenger who occupies the first array seat is decreased. In addition, because the hinge bracket of the conventional double-folding seat is exposed on the outside, appearance is compromised.

In a conventional double-folding seat having two divided seats, hinge brackets are typically provided on both sides of lower portions of the left and right seat cushions. Such hinge brackets may be connected to a vehicle body through a bolt coupling. The hinge brackets, which are made of steel, are covered by hinge bracket covers. In this instance, however, a plurality of hinge brackets must be coupled to the vehicle body through a bolt coupling, and the cover is coupled to the hinge bracket in order to prevent the hinge bracket from being exposed. Accordingly, the process for mounting the double-folding seat becomes complicated and manufacturing cost also increases.

The information disclosed in this Background of the Invention section is only for enhancement of understanding of the background of the invention and should not be taken as an acknowledgement or any form of suggestion that this information forms the prior art that is already known in this country to a person of ordinary skill in the art.

SUMMARY OF THE INVENTION

Embodiments of the present invention provide a mounting structure for a double-folding seat for vehicles having non-limiting advantages of minimizing the rotating radius of the seat cushion, and increasing an aesthetic beauty, through a change of a hinge point of a rotation of a seat cushion, and simplifying an assembling process.

In one embodiment of the present invention, an exemplary mounting structure for a double-folding seat for vehicles in which a seat cushion and a seat back can be double-folded comprises a cushion hinge bracket, a cushion hinge wire, and a vehicle body hinge bracket. The cushion hinge bracket is connected to a lower portion of the seat cushion. The cushion hinge wire is rotatably connected to the cushion hinge bracket. The vehicle body hinge bracket is provided to an upper surface of a seat mounting part and to which the cushion hinge wire is rotatably connected, so that the seat cushion is foldable with respect to the vehicle body hinge bracket.

The vehicle body hinge bracket may comprise a pair of a first hinge bracket that is formed integrally to the seat mounting part and a second hinge bracket that is connected to the seat mounting part through a bolt coupling.

In another embodiment of the present invention, a stopper wire for limiting a folding angle of the seat cushion by contacting the seat mounting part may be coupled to the cushion hinge wire.

In an alternative embodiment, mounting structure for a double-folding seat for a vehicle is utilized with a seat including a seat cushion and a seat back and in a vehicle having a passenger compartment with a floor portion defining a raised seat mounting part. Such a mounting structure may comprise a cushion hinge bracket configured and dimensioned for connection to a lower portion of the seat cushion, a vehicle body hinge bracket configured and dimensioned for securing on the seat mounting part, and a cushion hinge wire extending between and rotatably connected both the cushion hinge bracket and the vehicle body hinge.

In a further embodiment, the vehicle body hinge may comprise a pair of hinge brackets. A first hinge bracket is configured and dimensioned to be integrally formed with the seat mounting part and a second hinge bracket is configured and dimensioned to be separately attached to the seat mounting part. The second hinge bracket may be configured for attachment to the seat mounting part with a threaded fastener connection.

In another alternative embodiment of the present invention, a double folding seat is provided for a vehicle having a passenger compartment with a floor portion defining a seat mounting part. In this embodiment, the seat includes a seat cushion having a lower portion and a seat back cooperating with the seat cushion and attachable thereto. The seat further comprises a cushion hinge bracket connected to the lower portion of the seat cushion, a vehicle body hinge bracket configured and dimensioned for securing on the seat mounting part, and a cushion hinge wire extending between and rotatably connected to both the cushion hinge bracket and the vehicle body hinge.

BRIEF DESCRIPTION OF THE DRAWINGS

The accompanying drawings illustrate exemplary embodiments of the present invention, and, together with the description, serve to explain the principles of the present invention, wherein.

DETAILED DESCRIPTION OF THE EMBODIMENTS

Embodiments of the present invention will hereinafter be described in detail with reference to the accompanying drawings.

Figure 1:
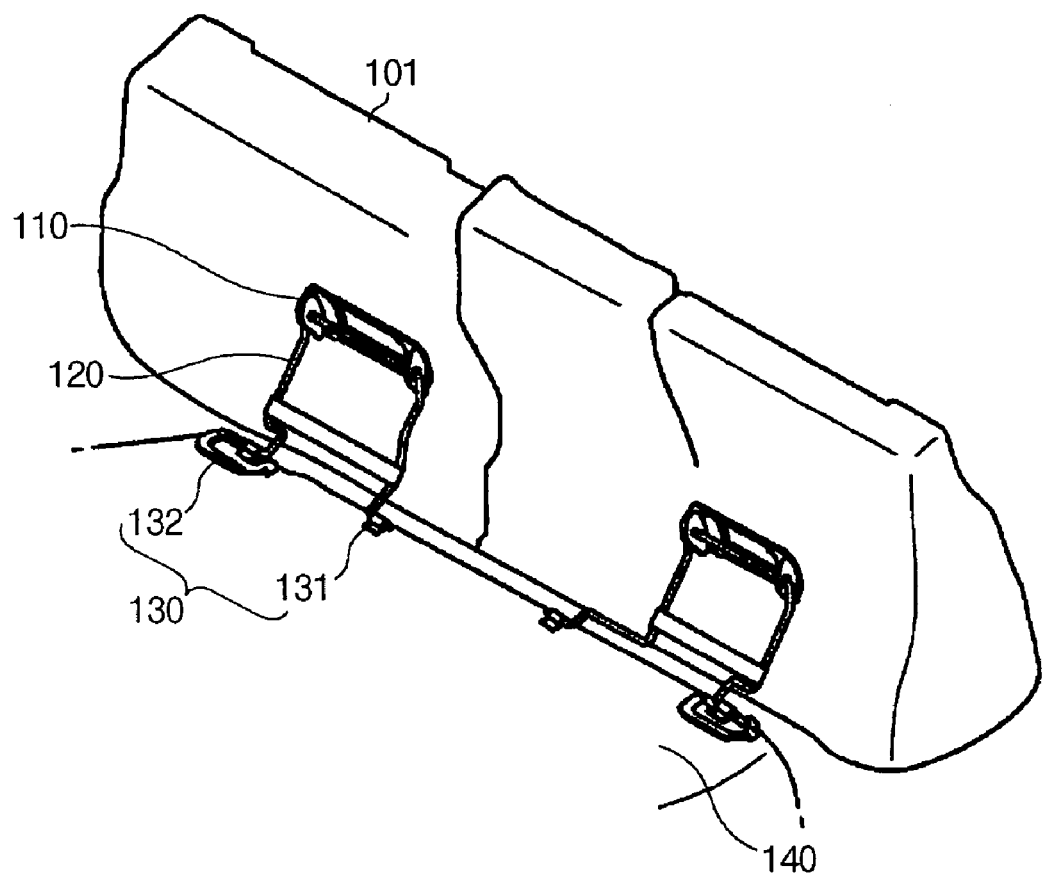
FIG. 1 is a mounting structure of a lower surface of a double-folding seat according to an embodiment of the present invention.

As shown in FIG. 1, a mounting structure for a double-folding seat according to an embodiment of the present invention comprises a cushion hinge bracket 110 that is connected to a lower portion of a seat cushion 101, a cushion hinge wire 120 that is rotatably connected to the cushion hinge bracket 110, and a vehicle body hinge bracket 130 that is fixed to an upper surface of a seat mounting part 140 and to which the cushion hinge wire 120 is rotatably connected. The cushion hinge bracket 110 may be firmly fixed to a frame of the seat cushion 101.

The vehicle body hinge bracket 130 may include a pair of a first hinge bracket 131 and a second hinge bracket 132 that are connected respectively to the seat mounting part 140. For example, the first hinge bracket 131 may be formed integrally to the seat mounting part 140, and the second hinge bracket 132 may be connected through a bolt coupling to the seat mounting part 140.

While assembling the cushion hinge wire 120, one end of the cushion hinge wire 120 is inserted into the first hinge bracket 131, the other end thereof is inserted into the second hinge bracket 132, and the second hinge bracket 132 is then connected to a vehicle body (e.g., to the seat mounting part of the vehicle body). Therefore, the seat cushion 101 can be easily assembled to the vehicle body. As shown in FIG. 1, in case of a second array seat, left and right seats are formed identically and they can be assembled.

Figure 2:
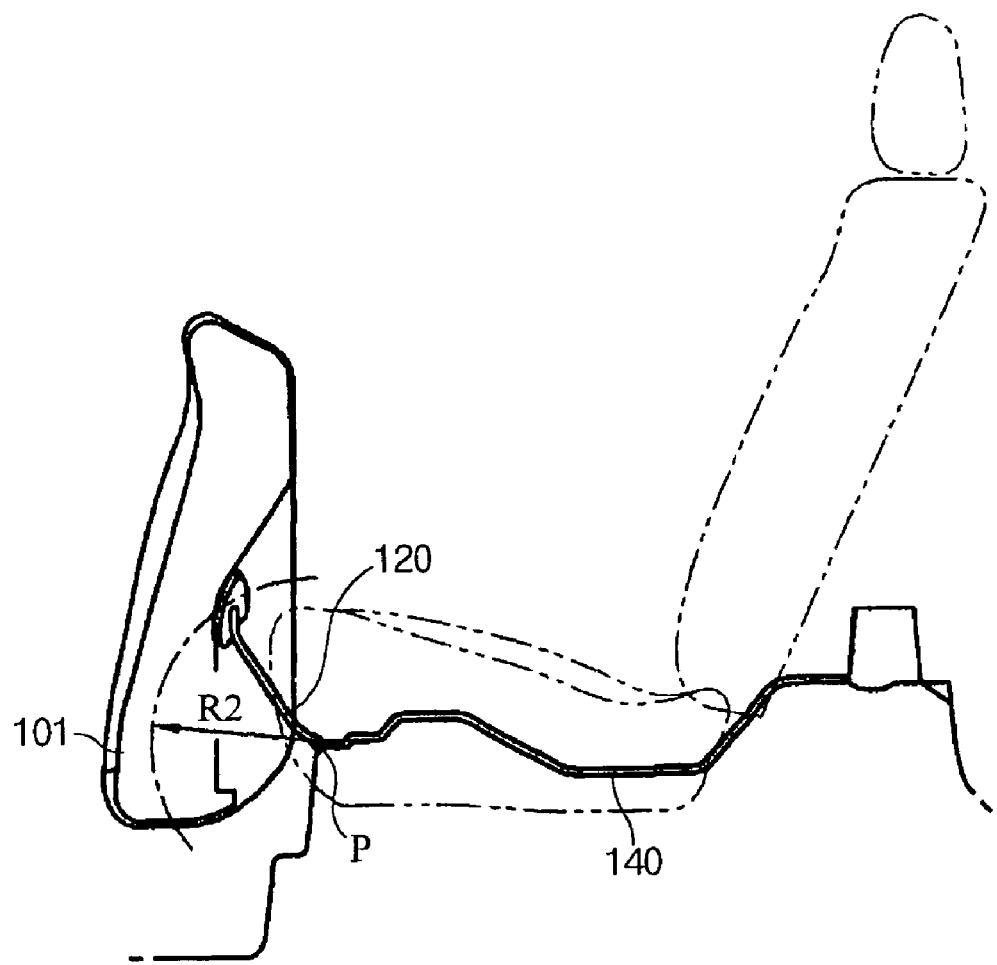
FIG. 2 shows an example of an operation of the mounting structure for a double-folding seat according to an embodiment of the present invention.

Referring to FIG. 2, a position P of the first and second hinge brackets 131 and 132, with respect to which the seat cushion 101 is folded, is located at an upper surface of the seat mounting part 140, which is different from a conventional mounting structure, so that a rotating radius R2 of the seat cushion 101 decreases when compared to that of the conventional mounting structure. Therefore, according to an embodiment of the present invention, it is not needed to slide the first array seat toward a front direction in order to prevent the second array double-folding seat from colliding with the first array seat while folding the second array double-folding seat.

Figure 3:
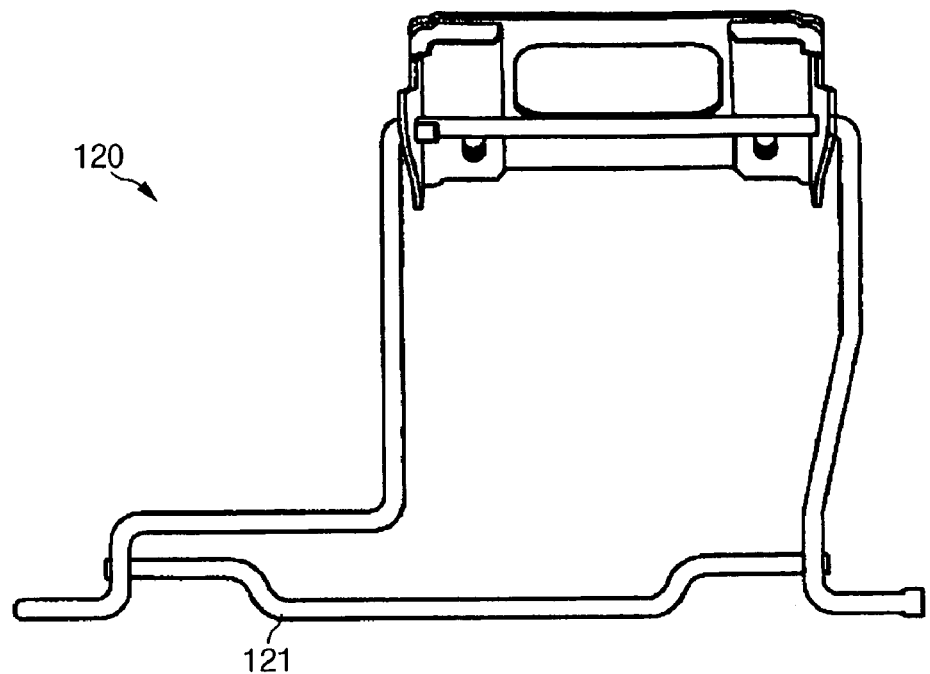
FIG. 3 shows a cushion hinge wire having a stopper wire of a mounting structure for a double-folding seat according to an embodiment of the present invention.

In a mounting structure for a double-folding seat according to another embodiment of the present invention, as shown in FIG. 3, a stopper wire 121 may be coupled to the cushion hinge wire 120 at portions near parts connected to the vehicle body hinge bracket 130. The stopper wire 121 contacts the seat mounting part 140 after the seat cushion 101 rotates at a specific angle, thereby limiting a folding angle of the seat cushion 101. In addition, by connecting the stopper wire 121 to the cushion hinge wire 120, a structural strength of the cushion hinge wire 120 can be improved so that distortion of the cushion hinge wire 120 can be minimized.

The stopper wire 121 may be coupled to both ends of the cushion hinge wire 120 through a welding. Because the cushion hinge wire 120 is provided with the stopper wire 121, the seat cushion 101 may be maintained at a specific angle when it is folded. Accordingly, a vertical height difference between divided seats of the same array can be minimized.

Figure 4:
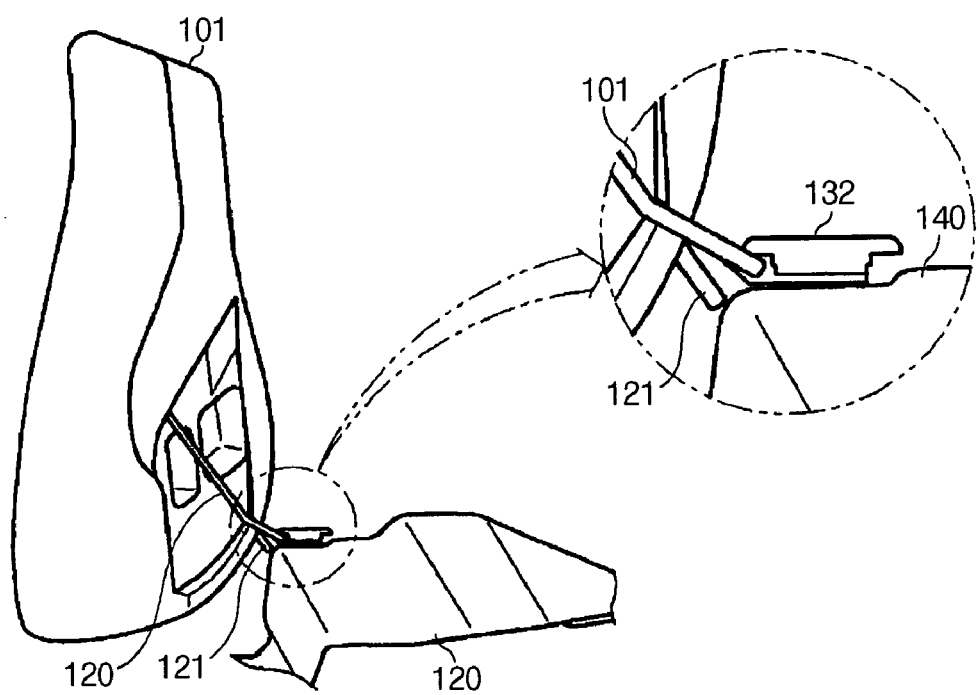
FIG. 4 shows an example of an operation of the mounting structure having a stopper wire for a double-folding seat according to an embodiment of the present invention.

FIG. 4 shows an example of an operation of the cushion hinge wire 120 having the stopper wire 121. If the seat cushion 101 is folded by approximately 90 degrees, the stopper wire 121 coupled to the cushion hinge wire 120 contacts the seat mounting part 140, so that the seat cushion 101 cannot be folded further.

If the mounting structure having the stopper wire 121 limiting a folding angle of a seat cushion is applied to a double-folding seat having at least two divided seats, the vertical height difference between divided seats of the same array can be minimized. For example, even if a double-folding seat having left and right seats having different masses is double folded, the stopper wire for each of the left and right seats may limit the folding angle of the left and right seats to a same angle, so that the vertical height difference between divided seats of the same array can be minimized.

In a mounting structure for a double-folding seat according to an embodiment of the present invention, a rotating hinge point of a seat cushion is positioned on an upper surface of the seat mounting surface, so that a rotating radius of the double-folding seat for folding the seat can be minimized. Accordingly, a usable receiving room in a vehicle can be increased, and an aesthetic beauty can be increased.

In addition, in the mounting structure for a double-folding seat according to an embodiment of the present invention, the cushion wire is connected to the seat cushion through the first hinge bracket that is formed integrally to the vehicle body and the second hinge bracket that is coupled to the vehicle body through a bolt coupling, so that an assembling process can be simple.

Furthermore, in the mounting structure for a double-folding seat according to an embodiment of the present invention, the cushion hinge wire is provided with the stopper wire for limiting the folding angle of the seat cushion, so that the vertical height difference between divided seats of the same array can be minimized.

While this invention has been described in connection with what is presently considered to be the most practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A mounting structure for a double-folding seat for vehicles in which a seat cushion and a seat back can be double-folded, comprising:
   a cushion hinge bracket connected to a lower portion of the seat cushion;
   a cushion hinge wire rotatably connected to the cushion hinge bracket;
   a vehicle body hinge bracket provided on an upper surface of a seat mounting part and to which the cushion hinge wire is rotatably connected, so that the seat cushion is foldable with respect to the vehicle body hinge bracket; and
   a stopper wire coupled to the cushion hinge wire, wherein the stopper wire limits a folding angle of the seat cushion by contacting the seat mounting part.

2. The mounting structure of claim 1, wherein the vehicle body hinge bracket comprises a first hinge bracket that is formed integrally with the seat mounting part and a second hinge bracket that is connected to the seat mounting part through a bolt coupling.

3. A mounting structure for a double-folding seat for a vehicle, the seat including a seat cushion and a seat back and the vehicle having a passenger compartment with a floor portion defining a raised seat mounting part, said mounting structure comprising:
- a cushion hinge bracket configured and dimensioned for connection to a lower portion of the seat cushion;
- a vehicle body hinge bracket configured and dimensioned for securing on the seat mounting part;
- a cushion hinge wire extending between and rotatably connected to both the cushion hinge bracket and the vehicle body hinge; and
- a stopper wire coupled to the cushion hinge wire, wherein the stopper wire limits a folding angle of the seat cushion by contacting the seat mounting part.

4. The mounting structure of claim 3, wherein the vehicle body hinge comprises a pair of hinge brackets, including a first hinge bracket configured and dimensioned to be integrally formed with the seat mounting part and a second hinge bracket configured and dimensioned to be separately attached to the seat mounting part.

5. The mounting structure of claim 4, wherein the second hinge bracket is configured for attachment to the seat mounting part with a threaded fastener connection.

6. A double folding seat for a vehicle, the vehicle having a passenger compartment with a floor portion defining a seat mounting part, comprising:
- a seat cushion having a lower portion;
- a seat back cooperating with the seat cushion and attachable thereto;
- a cushion hinge bracket connected to the lower portion of the seat cushion;
- a vehicle body hinge bracket configured and dimensioned for securing on the seat mounting part;
- a cushion hinge wire extending between and rotatably connected to both the cushion hinge bracket and the vehicle body hinge; and
- a stopper wire coupled to the cushion hinge wire and configured and dimensioned for limiting a folding angle of the seat cushion by contact with the seat mounting part.

7. The double-folding seat of claim 6, wherein the vehicle body hinge comprises a pair of hinge brackets, including a first hinge bracket configured and dimensioned to be integrally formed with the seat mounting part and a second hinge bracket configured and dimensioned to be separately attached to the seat mounting part.

8. The double-folding seat of claim 7, wherein the second hinge bracket is configured for attachment to the seat mounting part with a threaded fastener connection.

* * * * *